C. BERGENER.
LANTERN.
APPLICATION FILED MAY 15, 1911.
1,067,963. Patented July 22, 1913.
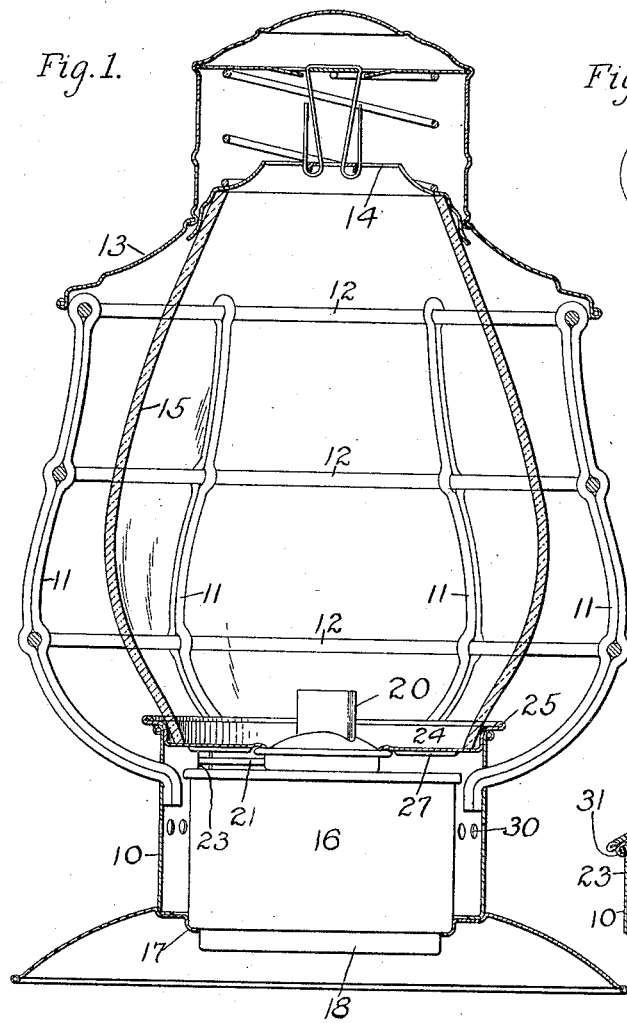
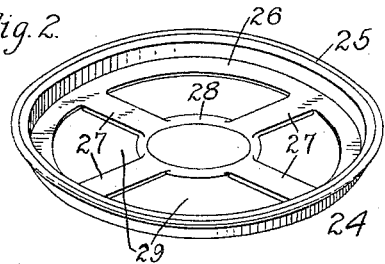
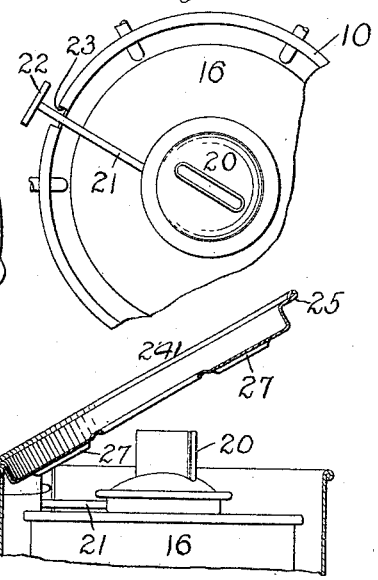
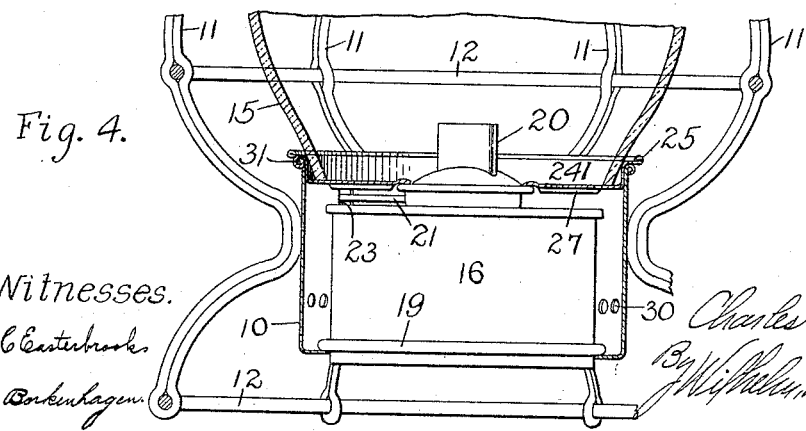
Witnesses.
C. C. Easterbrooks
A. Borkenhagen
Inventor.
Charles Bergener,
By Wilhelm, Parker & Hard,
Attorneys.

UNITED STATES PATENT OFFICE.

CHARLES BERGENER, OF ROCHESTER, NEW YORK, ASSIGNOR TO C. T. HAM MANUFACTURING COMPANY, OF ROCHESTER, NEW YORK.

LANTERN.

1,067,963.  Specification of Letters Patent.  Patented July 22, 1913.

Application filed May 15, 1911. Serial No. 627,244.

*To all whom it may concern:*

Be it known that I, CHARLES BERGENER, a citizen of the United States, residing at Rochester, in the county of Monroe and State of New York, have invented a new and useful Improvement in Lanterns, of which the following is a specification.

This invention relates to hand lanterns of the type which are used on railroads and in which the oil pot is removably arranged within the body hoop, into which it is inserted from above, and in which the globe, which is inserted into the guard basket from above, is held by a globe holder arranged on the underside of the hinged lantern top.

The object of this invention is to produce a lantern of this character in which the oil pot is held in position by simple, compact and convenient devices.

In the accompanying drawings: Figure 1 is a sectional elevation of a lantern embodying this invention. Fig. 2 is a detached perspective view of the globe supporting frame. Fig. 3 is a fragmentary top plan view of the body hoop and oil pot. Fig. 4 is a fragmentary sectional elevation of the lower part of a lantern embodying the invention in a modified form. Fig. 5 is a fragmentary sectional elevation of the upper part of the body hoop and of the oil pot and the globe supporting frame.

Like reference characters refer to like parts in the several figures.

10 represents the body hoop, 11 the upright members of the guard basket, 12 the horizontal rings thereof, 13 the lantern top, 14 the spring-pressed globe holder arranged on the under side of the top, and 15 the globe. All of these parts may be of any suitable construction.

16 represents the oil pot which rests on an internal flange or shoulder 17 forming the annular bottom of the body hoop. The oil pot may be provided for this purpose with a reduced bottom portion 18, as represented in Fig. 1, or with a projecting bead or shoulder 19, as represented in Fig. 4.

20 represents the burner mounted on the oil pot in any suitable manner and 21 the wick-raiser shaft having its button 22 arranged outside of the body hoop, which latter is provided in its upper edge with a notch 23 for this shaft.

24 represents a globe supporting frame which rests upon the body hoop and extends inwardly from the same over the oil pot and burner and forms a depressed seat for the globe and a holder for the oil pot. This frame rests loosely on the body hoop by means of its marginal flange 25 and comprises a depressed annular outer portion 26 on which the globe rests, radial arms 27, and an inner annular portion 28 which is located over the oil pot or burner and surrounds the latter. This frame extending over the oil pot or burner holds the oil pot from being raised out of its seat in the bottom of the body hoop in handling the lantern, and is held in position by the globe resting on the frame, the globe being held down on its seat by the hinged top and the globe holder attached thereto. The openings 29 between the arms of the globe supporting frame permit the air to pass upwardly into the globe from the annular space between the body hoop and the oil pot, the body hoop being provided with the usual perforations 30 for admitting the air.

The globe supporting frame may be detachable from the body hoop, as represented in Fig. 1, so that it can be removed for inserting and removing the oil pot, or the frame 241 may be connected with the body hoop by a hinge 31, as represented in Figs. 4 and 5, so that it can be swung up for that purpose. When the globe has been removed and the globe supporting frame has been removed or swung up, as the case may be, the oil pot can be removed, thereby uncovering the opening in the bottom of the body hoop which is surrounded by the flange or shoulder 17. The body hoop can now be cleaned thoroughly on the inner side with great convenience. When the parts are in their normal position the oil pot is securely held in place by the globe supporting frame and globe, without requiring any additional fastening, and the wick-raiser shaft is accessible on the outer side of the body hoop.

I claim as my invention:

1. In a lantern, the combination with a body hoop having a bottom permanently secured thereto and adapted to support the oil pot which is inserted from above, an oil pot resting loosely on said bottom, means for preventing lateral displacement of the oil pot, a globe supporting frame resting loosely on said body hoop and extending over the oil pot, means on said frame for holding said oil pot against displacement in an upward direction, and a globe resting on said frame, substantially as set forth.

2. In a lantern, the combination with a body hoop having a bottom permanently secured thereto and having in its upper edge a notch for the wick raiser shaft, an oil pot resting on said bottom, means for preventing lateral displacement of the oil pot, a burner having its wick raiser shaft projecting through said notch to the outside of the hoop, a globe supporting frame resting loosely on said body hoop and extending over the oil pot, means on said frame for holding the oil pot in the body hoop against displacement in an upward direction, and a globe resting on said frame, substantially as set forth.

Witness my hand in the presence of two subscribing witnesses.

CHARLES BERGENER.

Witnesses:
   LEO E. MASSETH,
   WALLACE I. MILLER.

---

Copies of this patent may be obtained for five cents each, by addressing the "Commissioner of Patents, Washington, D. C."